(12) United States Patent
Ikeda

(10) Patent No.: US 7,859,252 B2
(45) Date of Patent: Dec. 28, 2010

(54) ROTATIONAL ANGLE DETECTING DEVICES

(75) Inventor: Tsutomu Ikeda, Aichi-ken (JP)

(73) Assignee: Aisan Kogyo Kabushiki Kaisha, Obu-shi, Aichi-ken (JP)

( * ) Notice: Subject to any disclaimer, the term of this patent is extended or adjusted under 35 U.S.C. 154(b) by 727 days.

(21) Appl. No.: 11/769,767

(22) Filed: Jun. 28, 2007

(65) Prior Publication Data

US 2008/0012555 A1 Jan. 17, 2008

(30) Foreign Application Priority Data

Jun. 29, 2006 (JP) ............................. 2006-179499
Jun. 29, 2006 (JP) ............................. 2006-179501

(51) Int. Cl.
*G01B 7/30* (2006.01)
(52) U.S. Cl. ............................. 324/207.25; 73/514.31
(58) Field of Classification Search ............. 324/207.2, 324/207.25, 251; 73/514.31, 514.39; 123/612, 123/617; 338/32 R, 32 H
See application file for complete search history.

(56) References Cited

U.S. PATENT DOCUMENTS

| 6,759,594 | B2 * | 7/2004 | Iijima et al. ................. | 174/135 |
| 2005/0073299 | A1 * | 4/2005 | Yoshikawa et al. ..... | 324/207.25 |
| 2007/0247143 | A1 | 10/2007 | Ikeda et al. | |

FOREIGN PATENT DOCUMENTS

| DE | 19544660 A1 * | 6/1997 |
| JP | 2001289610 | 10/2001 |
| JP | 2004184364 | 7/2004 |
| JP | 2004251831 | 9/2004 |
| JP | 2005091275 | 4/2005 |
| JP | 2005233768 | 9/2005 |

OTHER PUBLICATIONS

Hartmut Brammer,Partial English Translation of DE 19544660 A1, Jun. 1997.*

\* cited by examiner

*Primary Examiner*—Bot L LeDynh
(74) *Attorney, Agent, or Firm*—Dennison, Schultz & MacDonald

(57) ABSTRACT

A rotational angle detecting device has a pair of permanent magnets and an angle sensor. Electrical connecting terminals are connected to the angle sensor and further connected to conductors. The conductors have seconds ends opposite to the first ends and serving as connector terminals of the connector. In one embodiment, the rotational angle detecting device includes a first resin-molded portion and a second resin-molded portion. The first resin-molded portion includes at least the electrical connecting terminals, a part of the angle sensor and the first ends of the conductors embedded within a first resin. The second resin-molded portion includes portions of the conductors embedded within a second resin. In another embodiment, capacitors are connected to the connector conductors. The angle sensor has a magnetic detecting element positioned substantially perpendicularly to the rotational axis of the rotary section. The connector conductors have parallel portions extending substantially parallel to the rotational axis. A portion of the angle sensor assembly extending from the angle sensor to the parallel portions of the connector conductors has a substantially L-shaped configuration. The capacitor(s) is disposed on the same side as the magnetic detecting element with respect to the L-shaped portion.

17 Claims, 14 Drawing Sheets

ROTATIONAL ANGLE DETECTING DEVICES

This application claims priority to Japanese patent application serial numbers 2006-179499 and 2006-179501, the contents of which are incorporated herein by reference.

BACKGROUND OF THE INVENTION

1. Field of the Invention

The present invention relates to rotational angle detecting devices and in particular to rotational angle detecting devices that can detect the rotational angel in a non-contact manner. The present invention also relates to resin-molded products usable for the rotational angle detecting devices and methods of manufacturing such products.

2. Description of the Related Art

In general, a rotational angle detecting device includes a rotary section and a stationary section. A pair of permanent magnets are attached to the rotary section in positions opposing to each other with respect to the center of rotation. An angle sensor is disposed on the stationary section and can determine the rotational angle of the rotary section based on change of a magnetic field as the rotary section rotates. The magnetic field is generated between the permanent magnets. A connector is provided on the stationary section for electrically connecting the rotational angle detecting device to an external device.

For example, Japanese Laid-Open Patent Publication No. 2001-289610 discloses a rotational angle detecting device shown in FIGS. 17(A) and 17(B). With this rotational angle detecting device, a plurality of connecting terminals 102 (only one connecting terminal 102 is shown in the drawings) of an angle sensor 100 are connected to end portions 105*t* of conductors 105 (only one conductor 105 is shown in the drawings). Opposite end portions 105*z* of the conductors 105 are used as connector terminals.

After the connecting terminals 102 have been connected to the end portions 105*t* of the conductors 105, they are inserted into a first die (not shown) for molding a first resin-molded portion 106 at a connecting region between the connecting terminals 102 and the conductors 105. Therefore, the connecting terminals 102 and the conductors 105 are integrated together. Next, a stator core 107 made of iron covers the resin-molded portion 106 and the angle sensor 100 located outside of the first-resin molded portion 106. Subsequently, the resin-molded portion 106 and the angle sensor 100 covered with the stator core 107, and the conductors 105 are inserted into a second die for molding the stationary section by resin. Thereafter, the rotary section and the stationary section are positioned relative to each other, so that a predetermined positional relation between the magnets of the rotary section and the angle sensor can be achieved.

However, with this rotational angle detecting device, the first resin-molded portion 106 covers only the connecting region between the connecting terminals 102 and the end portions 105*t* of the conductors 105, and the angle sensor 100 is located outside of the first resin-molded portion 106. More specifically, portions of the connecting terminals 102 and the angle sensor 100 are positioned outside of the first resin-molded portion 106. Therefore, for example, if the angle sensor 100 has been displaced or moved by an external force applied to the connecting terminals 102, there is a possibility that the assembling operation of the stator core 107 becomes troublesome or may not be properly performed.

In another known rotational angle detecting device disclosed in Japanese Laid-Open Patent Publication No. 2005-91275, electrical connecting terminals are provided on the angle sensor and are connected to connector conductors via conductors provided on a printed circuit board. Capacitors for preventing generation of noises are connected to the connector terminals via corresponding conductors provided on the printed circuit board.

Because the electrical connecting terminals of the angle sensor are connected to the connector conductors via the conductors on the printed circuit board, the known rotational angle detecting device must have a large size as it requires the printed circuit board. In addition, because the capacitors for preventing generation of noises are connected to the printed circuit board, it is difficult to position the capacitors proximally to the angle sensor. Therefore, the noise removing effect cannot be fully exerted.

SUMMARY OF THE INVENTION

It is accordingly an object of the present invention to teach improved rotational angle detecting devices and improved resin-molded products usable for the rotational angle detecting device, and improved methods for manufacturing the same.

One aspect according to the present invention includes rotational angle detecting devices including a pair of permanent magnets and an angle sensor. The pair of permanent magnets are attached to a rotary section and oppose to each other with respect to a rotational axis of the rotary section so as to produce a magnetic field there between. The angle sensor is attached to a stationary section and is positioned between the pair of permanent magnets. The angle sensor can determine a rotational angle of the rotary section based on change of the magnetic field caused by the rotation of the rotary section. A connector is provided on the stationary section and connects the angle sensor to an external device. Electrical connecting terminals are connected to the angle sensor and are further connected to first ends of conductors each having a strength greater than each of the electrical connecting terminals. The conductors have seconds ends opposite to the first ends and serving as connector terminals of the connector. The rotational angle detecting device further includes a first resin-molded portion and a second resin-molded portion. The first resin-molded portion is obtained by injecting a first resin into a first cavity of a first die, while at least the electrical connecting terminals, a part of the angle sensor and the first ends of the conductors are inserted into a cavity of the first die. The second resin-molded portion is obtained by injecting a second resin into a second die, while portions of the conductors extending from the first resin-molded portion are inserted into a second cavity of the second die. The first resin-molded portion and the second resin-molded portion constitute the stationary section. The connector is provided on the second resin-molded portion.

With this construction, at least the electrical connecting terminals, the part of the angle sensor and the first ends of the conductors connected to the electrical connecting terminals are fixed in position by the firs resin. Therefore, even in the event that the electrical connecting terminals have a low strength, the electrical connecting terminals may not be deformed during the manufacturing process. Thus, the positional relation between the angle sensor and the conductors can be reliably maintained by the first resin.

In addition, the first resin-molded portion having the angle sensor fixed in position relative to the conductors is inserted into the second die. Therefore, the angle sensor can be reliably fixed in position relative to the second molding die during the molding process of the second resin-molded portion. As a result, it is possible to prevent or minimize production of defective rotational angle detecting devices.

In one embodiment, the angle sensor is constructed to determine the rotational angle of the rotary section based on change of direction of the magnetic field produced between the permanent magnets. Therefore, it is possible to eliminate a stator core that is needed in the case of the arrangement where the rotational angle is determined by detecting the intensity of the magnetic field.

In another embodiment, the angle sensor includes a magnetic detecting element and a calculating part. The magnetic detecting element can detect the change of the magnetic field produced between the permanent magnets. The calculating part can calculate the rotational angle based on an output signal from the magnetic detecting element.

In a further embodiment, the first resin of the first resin-molded portion has a first linear expansion coefficient. The second resin of the second resin-molded portion has a second linear expansion coefficient that is substantially the same as the first linear expansion coefficient.

In a still further embodiment, the angle sensor includes a third resin having a third linear expansion coefficient. The first linear expansion coefficient is closer to the third linear expansion coefficient than the second linear expansion coefficient. Therefore, it is possible to reduce or minimize a stress that may be applied to the angle sensor when the first resin-molded portion and the angles sensor have been expanded or constricted due to change of the environmental temperature.

In a still further embodiment, the first resin-molded portion includes an unexposing section, an exposing section and a boundary section extending along a length between the unexposing section and the exposing section. The unexposing section is positioned within the second cavity of the second die during the molding process of the second resin-molded portion. The exposing section is positioned out of the second cavity of the second die during the molding process of the second resin-molded portion. The unexposing section and the exposing section are tapered toward a front end of the exposing section. The boundary section is not tapered.

Because the exposing section and the unexposing section are tapered, it is possible to easily remove the first resin-molded portion from the first die after the molding process. In addition, because the boundary section is not tapered, it is possible to prevent or minimize the creation of a clearance between the second die and the boundary section of the first resin-molded portion when the first resin-molded portion is inserted into the second die. Therefore, it is possible to prevent or minimize the generation of burrs at the region between the second resin-molded portion and the boundary section of the first resin-molded portion.

In a still further embodiment, the conductors connecting between the electrical connecting terminals of the angle sensor and the connector are divided into first conductors embedded within the first resin-molded portion and second conductors constituting the terminals of the connector. Portions of the first conductors extending from the first resin-molded portion, connecting regions between the first and second conductors, and the second conductors are embedded within the second-resin molded portion.

Because the conductors are divided into the first conductors and the second conductors, it is possible to manufacture a variety of stationary sections by using different second resin-molded portions and by commonly using the same first resin-molded portions.

In a still further embodiment, the first resin-molded portion has a substantially cylindrical configuration. Therefore, it is possible to rotate the conductors about the axis of the first resin-molded portion when the first resin-molded portion is inserted into the second die. Therefore, the position of the conductors can be easily determined.

In a still further embodiment, the first resin-molded portion includes a recess formed therein. The recess is formed by a positioning projection that is provided on an inner wall of the first cavity of the first die for positioning the angle sensor. Therefore, it is possible to prevent improper assembling of the angle sensor.

In a still further embodiment, the rotary section is a shaft of an intake air control device disposed within an intake air channel of an internal combustion engine. The stationary section is a casing of the intake air control device.

Another aspect according to the present invention includes resin-molded products including a first resin-molded portion. The first resin-molded portion includes a first resin body and an angle sensor assembly that has an angle sensor and first conductors. The first conductors have first ends electrically connected to the angle sensor and have second ends opposite to the first ends. The angle sensor assembly is embedded within the first resin body except for the second ends of the first conductors.

In one embodiment, the angle sensor assembly further includes electrical connecting terminals connecting between the angle sensor and the first conductors.

In another embodiment, the resin-molded product further includes a second resin-molded portion molded integrally with the first resin-molded portion. The second resin-molded portion includes a second resin body and second conductors. The second conductors are embedded within the second resin body. The second conductors have third ends electrically connected to the second ends of the first conductors and have fourth ends exposed to the outside of the second resin body.

A further aspect according to the present invention includes rotational angle detecting devices including a pair of permanent magnets and an angle sensor assembly. The pair of magnets are attached to a rotary section and oppose to each other with respect to a rotational axis of the rotary section so as to produce a magnetic field there between. The angle sensor assembly includes an angle sensor and connector conductors and at least one capacitor. The angle sensor is attached to a stationary section and is positioned between the pair of permanent magnets. The angle sensor is constructed to determine a rotational angle of the rotary section based on change of the magnetic caused by the rotation of the rotary section. The connector conductors are connected to electrical connecting terminals of the angle sensor. The at least one capacitor is connected to any of the connector conductors. The angle sensor includes a magnetic detecting element positioned substantially perpendicularly to the rotational axis of the rotary section. The connector conductors include parallel portions extending substantially parallel to the rotational axis. A portion of the angle sensor assembly extending from the angle sensor to the parallel portions of the connector conductors has a substantially L-shaped configuration. The at least one capacitor is disposed on the same side as the magnetic detecting element with respect to the L-shaped portion.

With this construction, the electrical connecting terminals of the angle sensor and the connector conductors are connected directly to each other. Therefore, no printed circuit board is necessary. In addition, the capacitor(s) is disposed on the same side as the magnetic detecting element, so that the capacitor(s) may not protrude on the side opposite to the magnetic detecting element. Therefore, the structure around the angle sensor may have a compact construction, and thus, the rotational angle detecting device may have a small size. Further, because the capacitor(s) is directly connected to the connector conductors, the capacitor(s) can be positioned proximally to the angle sensor. Therefore, the noise removing effect can be enhanced.

In one embodiment, the angle sensor is constructed to determine the rotational angle of the rotary section based on change of direction of the magnetic field produced between the permanent magnets.

In another embodiment, the angle sensor includes a magnetic detecting element and a calculating part. The magnetic detecting element can detect the change of the magnetic field produced between the permanent magnets. The calculating part is positioned substantially in parallel to the parallel portions of the connector conductors.

With this arrangement, because only the magnetic detecting element is positioned perpendicularly to the rotational axis of the rotational section, the size of the angle sensor and any other parts positioned between the permanent magnets and proximally to the angle sensor can be minimized with respect to the radial direction.

In a further embodiment, the angle sensor includes a magnetic detecting element and a calculating part. The magnetic detecting element can detect the change of the magnetic field produced between the permanent magnets. The magnetic detecting element and the calculating part are positioned substantially perpendicularly to the parallel portions of the connector conductors.

Because the magnetic detecting element and the calculating part are positioned substantially perpendicularly to the parallel portions of the connector conductors, the size of the angle sensor and any other parts positioned between the permanent magnets and proximally to the angle sensor can be minimized with respect to the axial direction.

In a further embodiment, the calculating part of the angle sensor and the parallel portions of the connector conductors are spaced from each other in juxtaposed relation.

With this arrangement, it is possible to reduce the distance between the angle sensor and the parallel portions of the connector conductors along the rotational axis. In addition, the calculating part of the angle sensor does not contact with the parallel portions of the connector conductors. Therefore, even in the event that an external torsional force has been applied to the region between the angle sensor and the connector conductors when positioning the angle sensor and the connector conductors relative to each other, such an external torsional force can be absorbed by portions of the electrical connecting terminals of the angle sensor. Therefore, the external torsional force does not concentrate to the calculating part or the connector conductors. For this reason, if a chip capacitor(s) is directly connected to the connector conductors, the chip capacitor(s) may not be damaged.

In a still further embodiment, the rotational angle detecting device includes two sensor assemblies and the magnetic detecting elements of the two sensor assemblies oppose to each other along the rotational axis of the rotary section. The angle sensors of the two sensor assemblies oppose to each other with respect to the rotational axis.

Therefore, even if one of the angle sensors has been failed, it is still possible to detect the rotational angle by the other of the angle sensors. For this reason, the reliability of the rotational angle detecting device can be improved.

In a still further embodiment, the rotational angle detecting device further includes a resin body. At least a part of the angle sensor, the electrical connecting terminals, the capacitor(s) and at least portions of the connector conductors are embedded within the resin body. Therefore, it is possible to reliably prevent the angle sensor from being displaced or damaged.

A further aspect according to the present invention includes angle sensor assemblies including an angle sensor, rigid conductors electrically connected to the angle sensor, and at least one capacitor directly connected to any of the conductors.

In one embodiment, the angle sensor includes a magnetic detecting element and a calculating part. The conductors extend along a first direction. The magnetic detecting element extends along a second direction that is substantially perpendicular to the first direction. The at least one capacitor is positioned along the conductors on the same side as the magnetic detecting element.

In another embodiment, the angle sensor further includes electrical connecting terminals connecting between the calculating part and the conductors. The calculating part extends along a direction parallel to the first direction. The calculating part is spaced from the conductors along the second direction.

A further aspect according to the present invention includes a method of molding a resin-molded product. The method includes steps of inserting an angle sensor assembly into a first die and injecting a first resin into the first die, so that a first resin-molded portion having the angle sensor assembly integrated with the first resin is molded. The angle sensor assembly includes an angle sensor and first conductors. The first conductors have first ends electrically connected to the angle sensor and have second ends opposite to the first ends. The angle sensor assembly is embedded within the first resin except for the second ends of the first conductors.

In one embodiment, the methods further include the steps of inserting the first resin-molded portion into a second die and injecting a second resin into the second die, so that a second resin-molded portion is molded integrally with the first resin-molded portion. The second resin-molded portion includes second conductors. The second conductors are embedded within the second resin. The second conductors have third ends electrically connected to the second ends of the first conductors and have fourth ends exposed to the outside of the second resin body.

DETAILED DESCRIPTION OF THE INVENTION

Each of the additional features and teachings disclosed above and below may be utilized separately or in conjunction with other features and teachings to provide improved rotational angle detecting devices, improved resin-molded products usable for the rotational angle detecting devices and improved methods of manufacturing such devices and products. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

An embodiment according to the present invention will now be described with reference to FIGS. 1 to FIGS. 10(A) and 10(B). In this embodiment, a rotational angle detecting device 40 is incorporated into a throttle control device 10. Therefore, the throttle control device 10 will be described in brief before the explanation of the rotational angle detecting device 40.

<General Construction of Throttle Control Device 10>

The throttle control device 10 is an electronically controlled device used for controlling the amount of intake air to be supplied to an engine, such as an internal combustion engine (not shown) of an automobile. The throttle control device 10 can operate in response to the operation of an accelerator pedal (not shown) provided within a cabin of the automobile.

Figure 1:
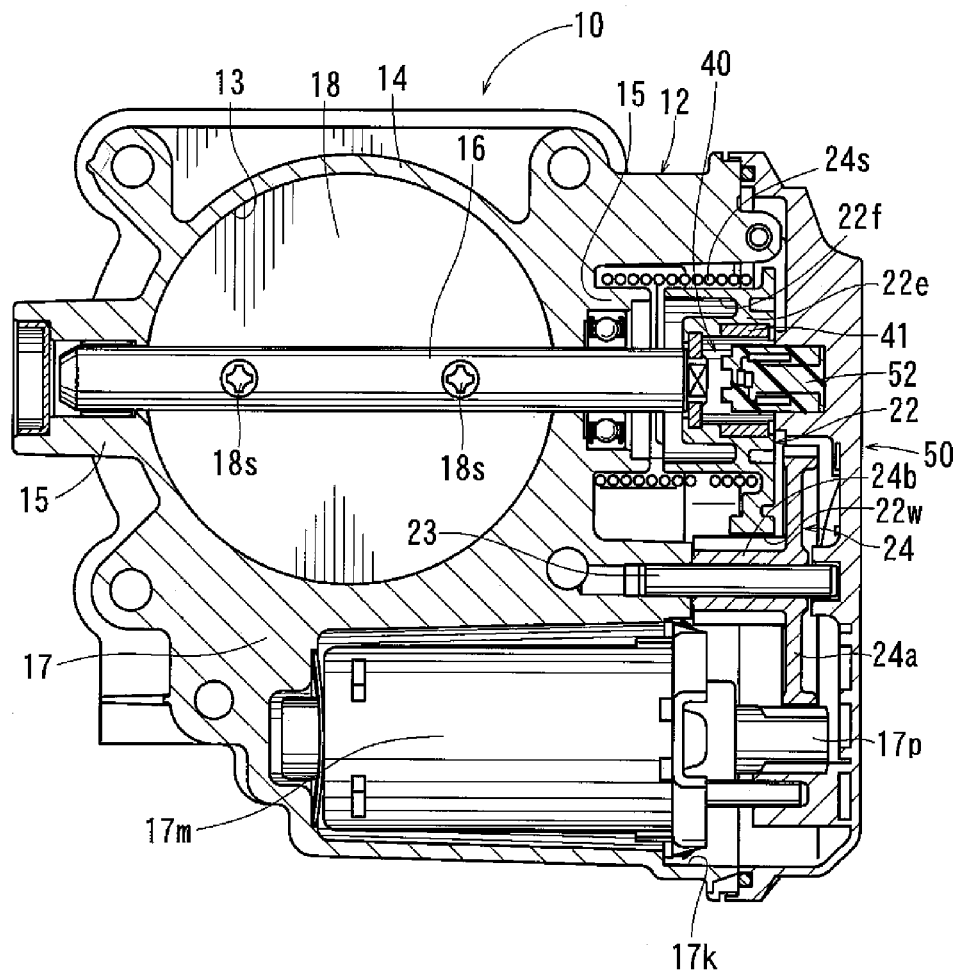
FIG. 1 is a vertical sectional view of a throttle body incorporating a rotational angle detecting device according to an embodiment of the present invention.
Figure 2:
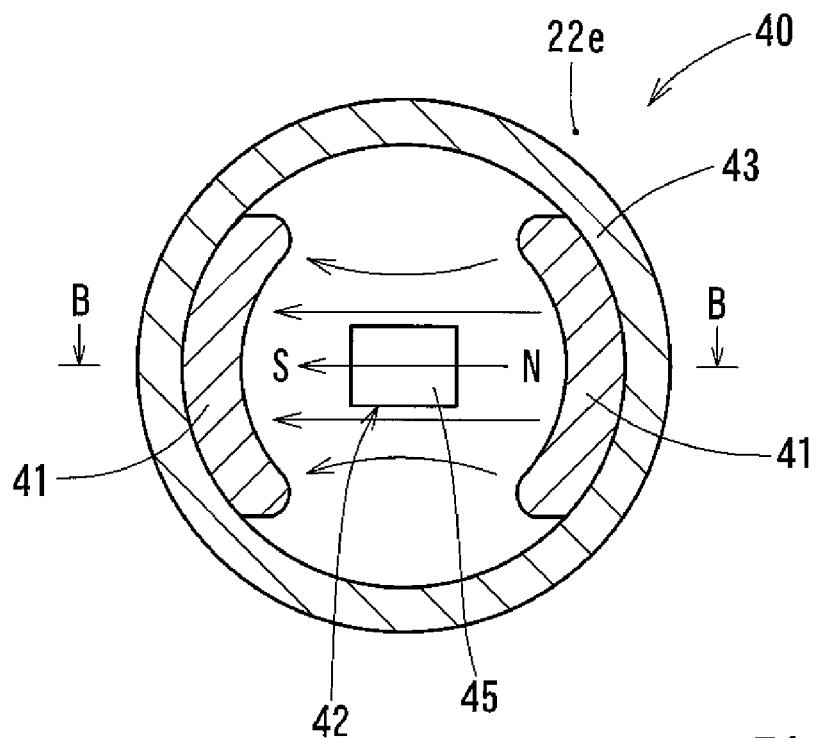
FIG. 2(A) is a front view of the rotational angle detecting device and illustrating a principle of measurement of the rotational angle.
FIG. 2(B) is a vertical sectional view of the rotational angle detecting device.
Figure 2:
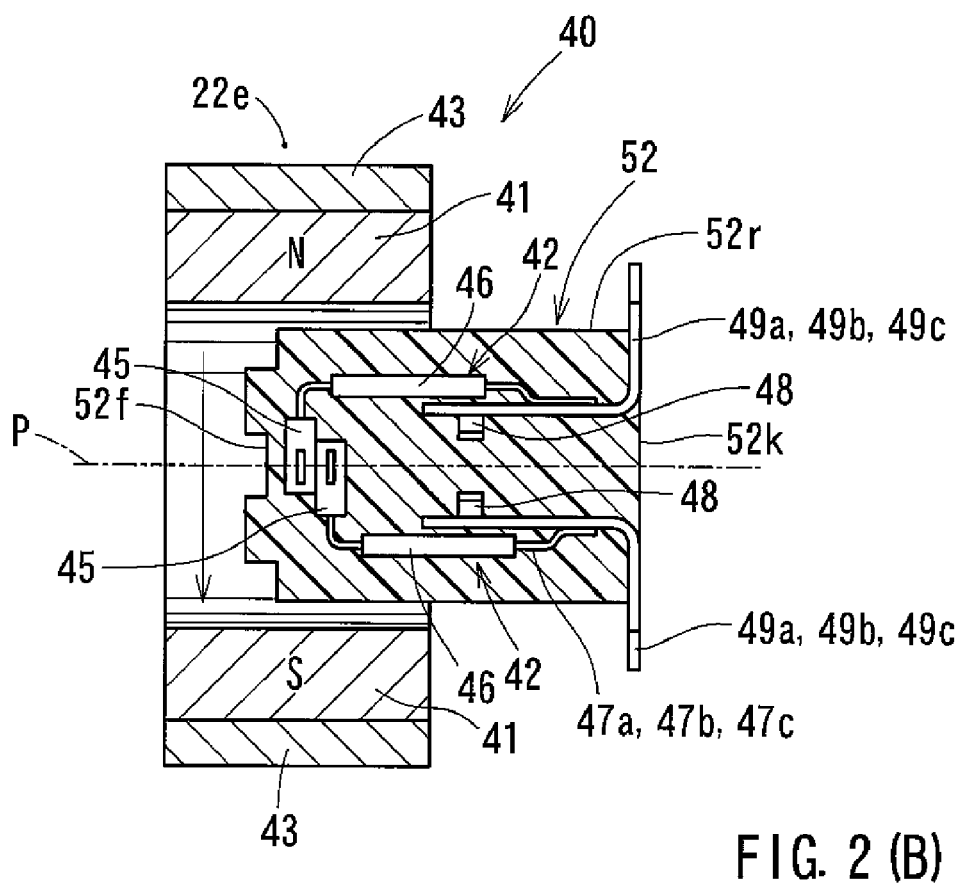

The throttle control device 10 includes a throttle body 12. As shown in FIG. 1, the throttle body 12 has a hollow cylindrical tubular bore wall portion 14 and a motor housing portion 17 that are formed integrally with each other. The bore wall portion 14 defines a bore 13, through which intake air can flow. An upstream side end and a downstream side end of the bore wall portion 14 are respectively connected to an air cleaner (not shown) and an intake manifold (not shown).

A metal throttle shaft 16 extends within the bore wall portion 14 across the bore 13 in the diametrical direction. The throttle shaft 16 is rotatably supported by the bore wall portion 14 via bearing portions 15 that are disposed on right and left sides of the bore wall portion 14. A circular disk-like throttle valve 18 is fixedly attached to the throttle shaft 16 by screws 18s, so that the throttle valve 18 can rotate within the bore 13.

The right end portion of the throttle shaft 16 extends through and beyond the right-side bearing 15. A throttle gear 22 configured as a sector gear is fixedly attached to the right end portion of the throttle shaft 16, so that the throttle gear 22 rotates with the throttle shaft 16. The throttle gear 22 includes an inner sleeve 22a on the side of the rotation center, an outer sleeve 22f disposed on the outer side of the inner sleeve 22a, and a sector gear portion 22w disposed about the inner outer sleeve 22f. A tubular yoke 43 (see FIG. 2(A) ) and a pair of permanent magnets 41 (hereinafter simply called "magnets 41") are fixedly attached to the inner wall surface of the inner sleeve 22e of the throttle gear 22. A back spring 24s configured as a coil spring is fitted around and between the right-side bearing 15 and the outer sleeve 22f of the throttle gear 22 in order to bias the throttle valve 18 in a closing direction.

The motor housing portion 17 has a bottomed cylindrical tubular configuration and extends substantially parallel to the axis of the throttle shaft 16. A motor 17m, such as a DC motor, is received within the motor housing portion 17.

A countershaft 16 is mounted to the throttle body 12 at a position between the bore wall portion 14 and the motor housing portion 17 and extends parallel to the throttle shaft 16. A counter gear 24 is rotatably supported on the counter shaft 23 and includes gear portions 24a and 24b having different gear diameters from each other. The gear portion 24a having a larger diameter is in engagement with a motor pinion 17p attached to an output rotational shaft (not shown) of the motor 17m. The gear portion 24b having a smaller diameter is in engagement with the gear portion 22w of the throttle gear 22.

Therefore, as the motor 17m is driven by a signal supplied from an engine control unit (ECU) (not shown) in response to the stepping amount of the accelerator pedal, the rotational torque of the motor 17m is transmitted to the throttle shaft 16 via the motor pinion 17p, the counter gear 24 and the throttle gear 22. Then, the throttle valve 18 rotates within the bore 13 against the biasing force of the back spring 24s, so that the amount of intake air flowing through the bore 13 can be controlled.

A second resin-molded portion or a side cover 50 is attached to cover the right side of the throttle body 12. The side cover 50 is made of resin and serves to close an opening 17k of the motor housing portion 17 and to conceal the motor pinion 17p, the counter gear 24 and the throttle gear 22, etc. from the outside environment. A substantially cylindrical first resin-molded portion 52 is integrated with the side cover 50 and supports angle sensor assemblies including angle sensors 42 of the rotational angle detecting device 40 (see FIGS. 2(B) and 3). In the state where the side cover 50 is attached to the right side of the throttle body 12 as shown in FIG. 1, a front end portion of the first resin-molded portion 52, which serves as a support portion for the angle sensors 42, is inserted into the yoke 43 (see FIG. 2(A)) such that the front end portion is positioned on the same axis as the yoke 43 and between the permanent magnets 41 not to contact with these elements.

<Construction of Rotational Angle Detecting Device 40>

The rotational angle detecting device 40 can detect the degree of opening or an open angle of the throttle valve 18 based on the rotational angle of the throttle shaft 16. As shown in FIGS. 2(A) and 2(B), the rotational angle detecting device 40 is constituted by the yoke 43 attached to the inner sleeve 22e of the throttle gear 22, the pair of magnets 41, and two angle sensor assemblies including the angle sensors 42 embedded within the first resin-molded portion 52.

The yoke 43 is made of magnetic material and has a cylindrical tubular configuration. The yoke 43 is positioned along the same axis as the throttle shaft 16. The magnets 41 are attached to the inner wall surface of the yoke 43 so as to oppose to each other with respect to the center of the yoke 43. Each of the magnets 41 has a N-pole and a S-pole and has an arc-shaped configuration. As shown in FIG. 2(A), the magnets 41 are magnetized such that substantially parallel magnetic field lines are produced to extend across the space defined within the yoke 43.

As shown in FIGS. 2(A) and 2(B), the angle sensors 42 of the rotational angle detecting device 40 are positioned at predetermined positions between the magnets 41. Each of the angle sensors 42 can detect the change of direction of the magnetic field as the magnets 41 as well as the yoke 43 rotates together with the throttle shaft 16. Then, based on the detected change of direction of the magnetic field, each angle sensor 42 can determine the rotational angle of the throttle valve 18 or the rotational angle of the throttle shaft 16. In this embodiment, two angle sensors 42 are provided for a fail-safe purpose. Therefore, even in the even that one of the angle sensors 42 has failed to operate, the other angle sensor 42 can operate for detection. Therefore, it is possible to avoid the situation of non-ability of detection. In this specification, the throttle shaft 16 serves as a rotary section and the side cover 50 having the first resin-molded portion 52 serves as a stationary section.

Figure 3:
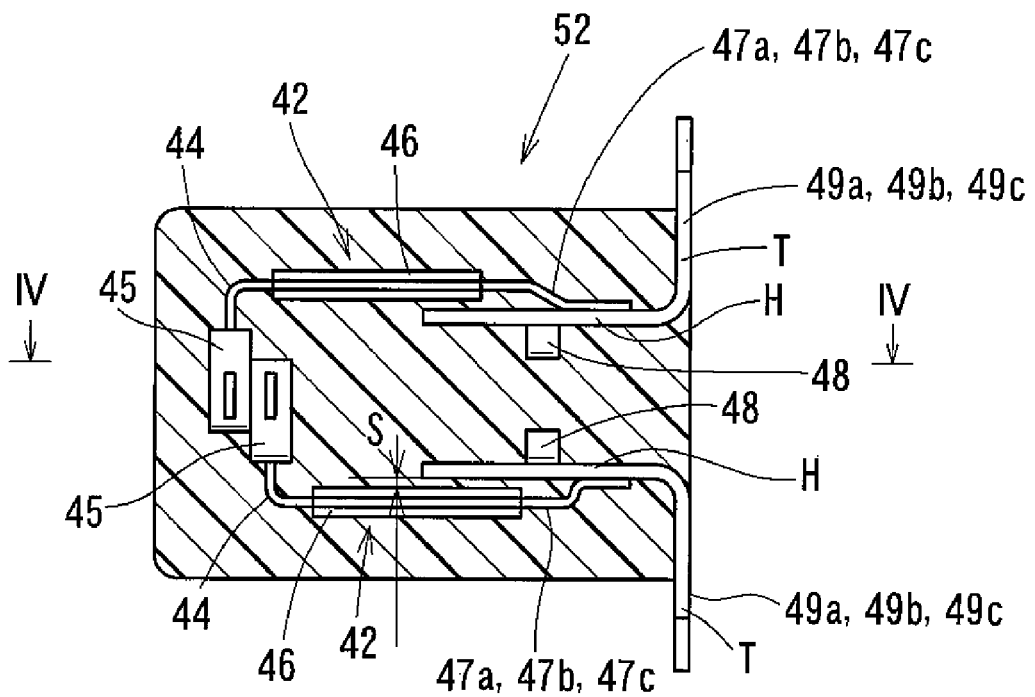
FIG. 3 is a vertical sectional view of a first resin-molded portion of the rotational angle detecting device.
Figure 4:
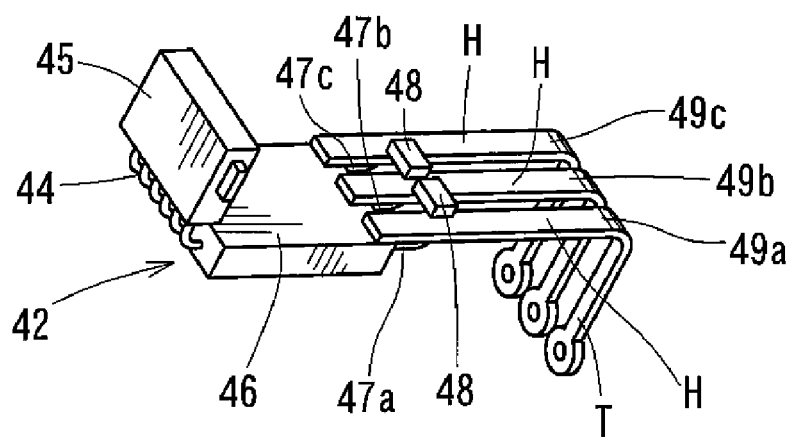
FIG. 4 is a perspective view of an angle sensor assembly of the rotational angle detecting device.

As shown in FIGS. 3 and 4, each of the angle sensors 42 has a magnetic detecting element 45 and a calculating part 46. The magnetic detecting element 45 can detect the direction of the magnetic field and can produce an output signal corresponding to the detected direction. The calculating part 46 can receive the output signal from the magnetic detecting element 45 and can calculate the rotational angle of the throttle shaft 16 based on the output signal.

The calculating part 46 is constituted by an semiconductor integrated circuit (IC) and is programmed to output a linear voltage signal corresponding to the rotational angle of the throttle shaft 16. The magnetic detecting element 45 and the calculating part 46 are electrically connected to each other via signal conductors 44. The signal conductors 44 are bent partly at right angles, so that the magnetic detecting element 45 and the calculating part 46 are positioned along directions intersecting with each other at a right angle. As shown in FIGS. 2(A) and 2(B), the magnetic detecting element 45 of each magnet sensor 42 is positioned substantially on an axis P (i.e., the rotational axis) of the throttle shaft 16 and between the magnets 41. The front face (front end face) of the magnetic detecting element 45 extends perpendicular to the axis P of the throttle shaft 16. Therefore, the calculating part 46 that is positioned perpendicularly to the magnetic detecting element 45 extends parallel to the axis P.

As shown in FIGS. 3 and 4, the calculating part 46 has an electrical connecting terminal 47a serving as a power supply or input terminal, an electrical connecting terminal 47b serving as a ground terminal, and an electrical connecting terminal 47c serving as a signal input terminal. The electrical connecting terminals 47a, 47b and 47c are respectively connected to L-shaped conductors 49a, 49b and 49c.

As shown in FIG. 3, each of the L-shaped conductors 49a, 49b and 49c has a parallel portion H and a perpendicular portion T. The parallel portion H extends parallel to the calculating part 46 and is spaced there from by a clearance S. The perpendicular portion T is bent at a right angle relative to the parallel portion H. The electrical connecting terminals 47a, 47b and 47c are respectively electrically connected to the L-shaped conductors 49a, 49b and 49c at their parallel portions H. As described previously, the signal conductors 44 are bent at right angles to position the magnetic detecting element 45 and the calculating part 46 perpendicularly to each other. Therefore, as shown in FIG. 3, the magnetic detecting element 45, the signal conductors 44, the calculating part 46, the electrical connecting terminals 47a, 47b and 47c, and the parallel portions H of the L-shaped conductors 49a, 49b and 49c provide a substantially L-shaped section of the angle sensor assembly. On the outer side with respect to the rotational axis P (lower side as viewed in FIG. 4) of the L-shaped section, connecting regions are provided for connecting between the electrically connecting terminals 47a, 47b and 47c of the calculating part 46 and the parallel portions H of the L-shaped conductors 49a, 49b and 49c. On the inner side (upper side as viewed in FIG. 4, i.e. the same side as the magnetic detecting element 45) of the L-shaped section, chip capacitors 48 for preventing generation of noises are connected between the L-shaped conductor 49a (for supplying power) and the L-shaped conductor 49b (for grounding), and between the L-shaped conductor 49b (for grounding) and the L-shaped conductor 49c (for outputting the signal).

<Molding Processes of First Resin-molded portion 52>

Figure 5:
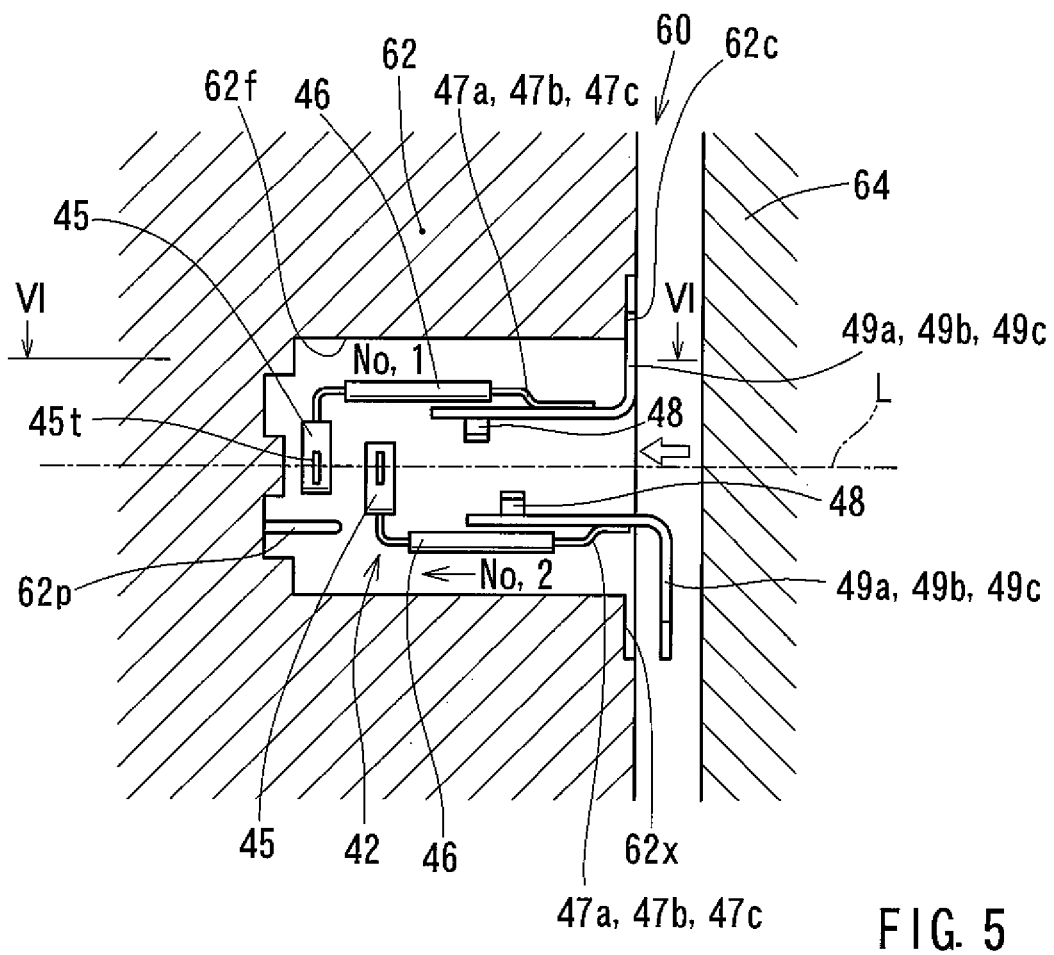
FIG. 5 is a cross sectional view showing a molding process of the first resin-molded portion.
Figure 6:
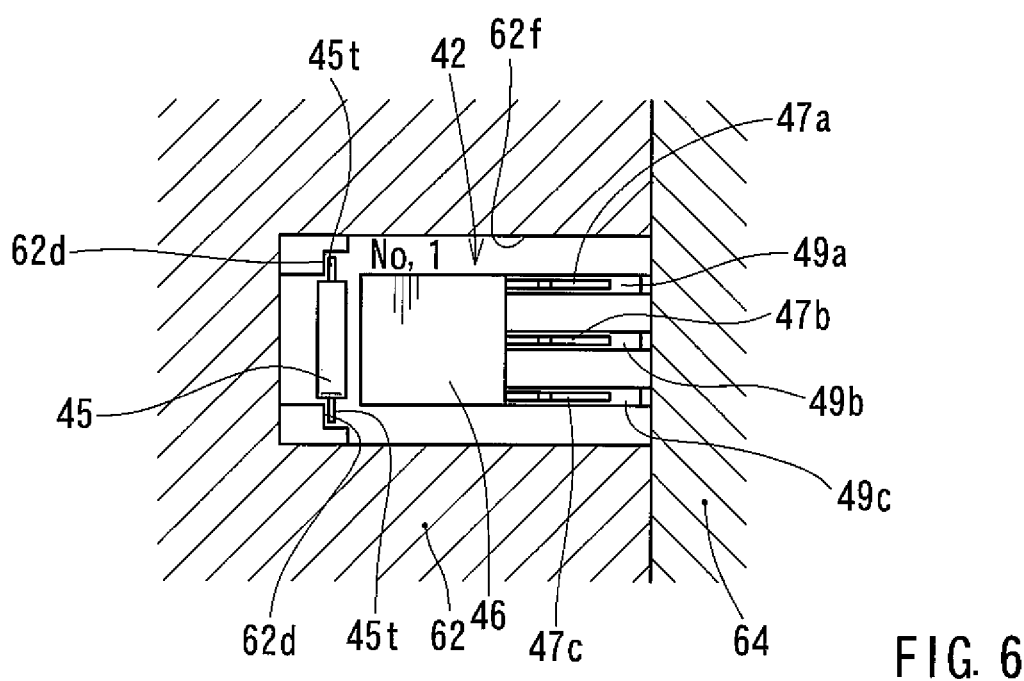
FIG. 6 is a cross sectional view taken along line VI-VI in FIG. 5.
Figure 7:
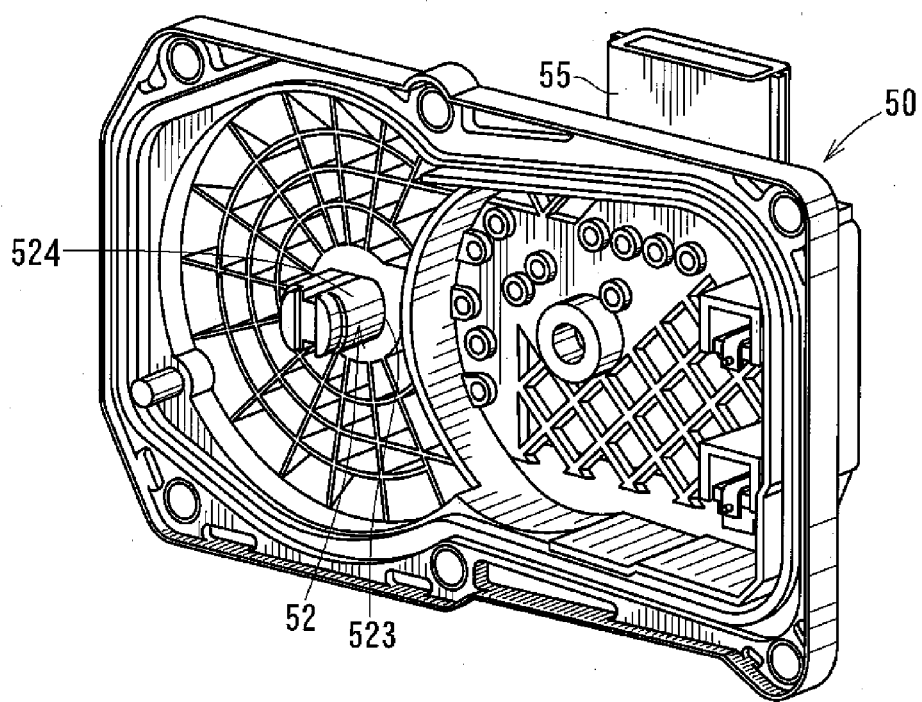
FIG. 7 is a perspective view of a side cover having the first resin-molded portion integrated therewith.

The first resin-molded portion 52 can be molded by using a first die 60 shown in FIGS. 5 and 6. As shown in FIGS. 5 and 6, the first die 60 includes a primary die part 62 and a pressing die part 64. The primary die part 64 is designed to mold a front face 52f (see FIG. 2(B)) and an outer circumferential surface 52r of the first resin-molded portion 52. For this purpose, the primary die part 64 defines a molding cavity 62f having a substantially cylindrical configuration. The pressing die part 64 is designed to mold a base end surface or a rear end surface 52k (see FIG. 2(B)) of the first resin-molded portion 52. For this purpose, the pressing die part 64 is configured to close the open end (right end as viewed in FIG. 5) of the molding cavity 62*f* of the primary die part 62 (see FIG. 6).

As shown in FIG. 6, a pair of stepped portions 62*d* are provided at the bottom of the molding cavity 62*d* for first positioning one of the two sensor assemblies each including the angle sensor 42 and its associated chip capacitors 48 and the L-shaped conductors 49*a*, 49*b* and 49*c*. This first one of the sensor assemblies will be hereinafter also called "first sensor assembly" or "No. 1 sensor assembly" and the second one will be hereinafter also called "second sensor assembly" or "No. 2 sensor assembly." The pair of stepped portions 62*d* are configured such that projections 45*t* provided on opposite sides with respect to the widthwise direction of the magnetic detecting element 45 of the first sensor assembly can engage the stepped portions 62*d* from a direction along a central line L of the molding cavity 62*f*. In addition, three recesses 62*c* (see FIG. 5) are formed in the circumferential edge of the opening of the molding cavity 62*f* for engaging the perpendicular portions T of the L-shaped conductors 49*a*, 49*b* and 49*c*. The perpendicular portions T are intended not to be embedded within the mold resin. In this way, the first sensor assembly is set within the molding cavity 62*f* of the primary die part 62 such that the projections 45*t* of the magnetic detecting element 45 are respectively supported by the stepped portions 62*d* and that the perpendicular portions T of the L-shaped conductors 49*a*, 49*b* and 49*c* engage the respective recesses 62*c*. In this set position, the magnetic detecting element 45 of the first sensor assembly is positioned parallel to the bottom wall (left side wall as viewed in FIGS. 5 and 6) and to oppose to the central portion of the bottom of the molding cavity 62*f*.

Next, the second sensor assembly is set within the molding cavity 62*f* such that the second sensor assembly opposes to the first sensor assembly with respect to the central line L. More specifically, the second sensor assembly is positioned such that the magnetic detecting element 45 of the second assembly opposes to the magnetic detecting element 45 of the first sensor assembly along the central line L. Also, three recesses 62*x* (see FIG. 5) similar to the recesses 62*c* are formed in the circumferential edge of the opening of the molding cavity 62*f* for engaging the perpendicular portions T of the L-shaped conductors 49*a*, 49*b* and 49*c* of the second sensor assembly in the set position. FIG. 5 shows the state where the second sensor assembly is being set within the molding cavity 62*f*.

A projection or pin 62*p* extends from the bottom of the molding cavity 62*f* of the primary die part 62 in the axial direction of the molding cavity 62*f* (more specifically, in the direction toward the opening of the molding cavity 62*f*) beyond the stepped portions 62*d*. The pin 62*p* serves to prevent improper setting of the first and second sensor assemblies. Thus, if the second sensor assembly has been properly set within the molding cavity 62*f*, the front end (right end as viewed in FIG. 5) of the pin 62*p* contacts with a portion of the second sensor assembly. On the other hand, if the first sensor assembly has been set to a position for the second sensor assembly shown in FIG. 5 until the first sensor assembly contacts with the pin 62*p*, the perpendicular portions T of the L-shaped conductors 49*a*, 49*b* and 49*c* cannot engage the recesses 62*x*. Thus, as described previously, the magnetic detecting element 45 of the second assembly is positioned to oppose to the magnetic detecting element 45 of the first sensor assembly along the central line L. For this reason, the length of the second sensor assembly along the central axis L is determined to be shorter than the length of the first sensor assembly. Therefore, the pin 62*p* can prevent improper setting of the first sensor assembly.

After the first and second sensor assemblies have been properly set into the molding cavity 62*f* of the primary die part 62, the first die 60 is closed and the resin is injected into the molding cavity 62*f* to mold the first resin-molded portion 52.

Figure 8:
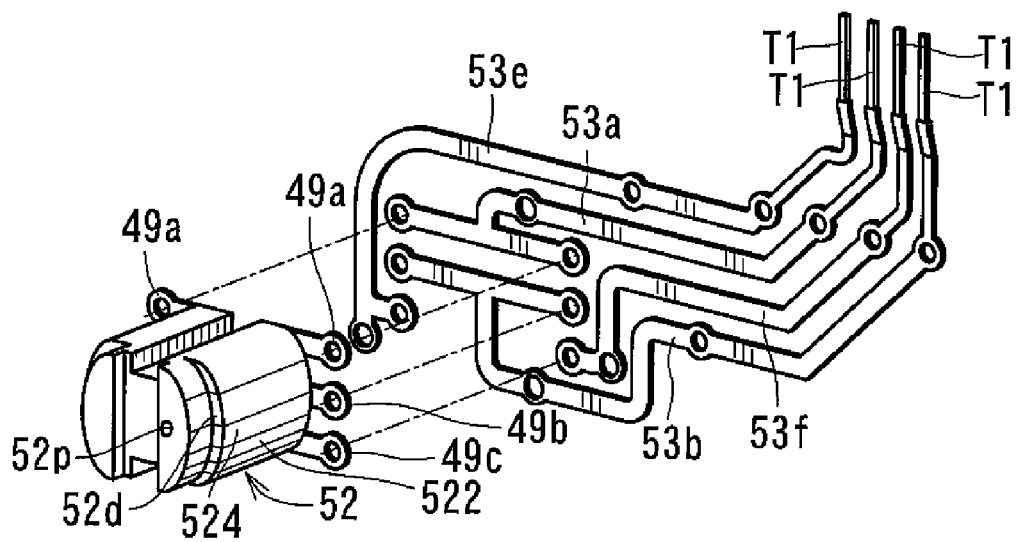
FIG. 8 is a perspective view showing the connecting relation between L-shaped conductors, power source conductors, ground conductors, and first and second signal conductors.
Figure 9:
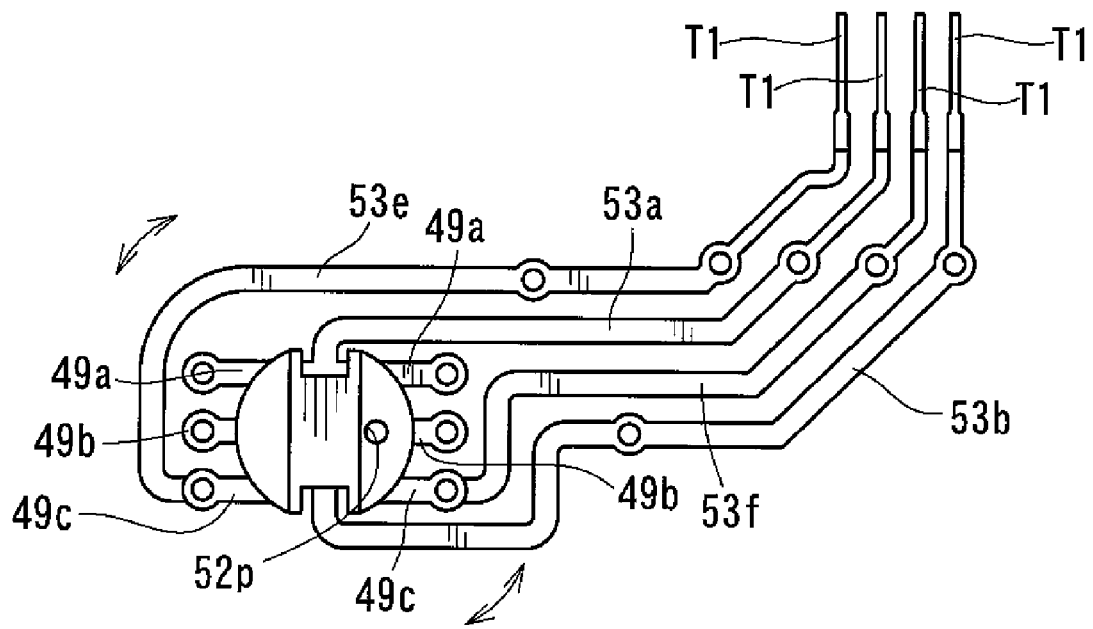
FIG. 9 is a perspective view showing the connecting relation between the L-shaped conductors, the power source conductors, the ground conductors, and the first and second signal conductors.
Figure 10:
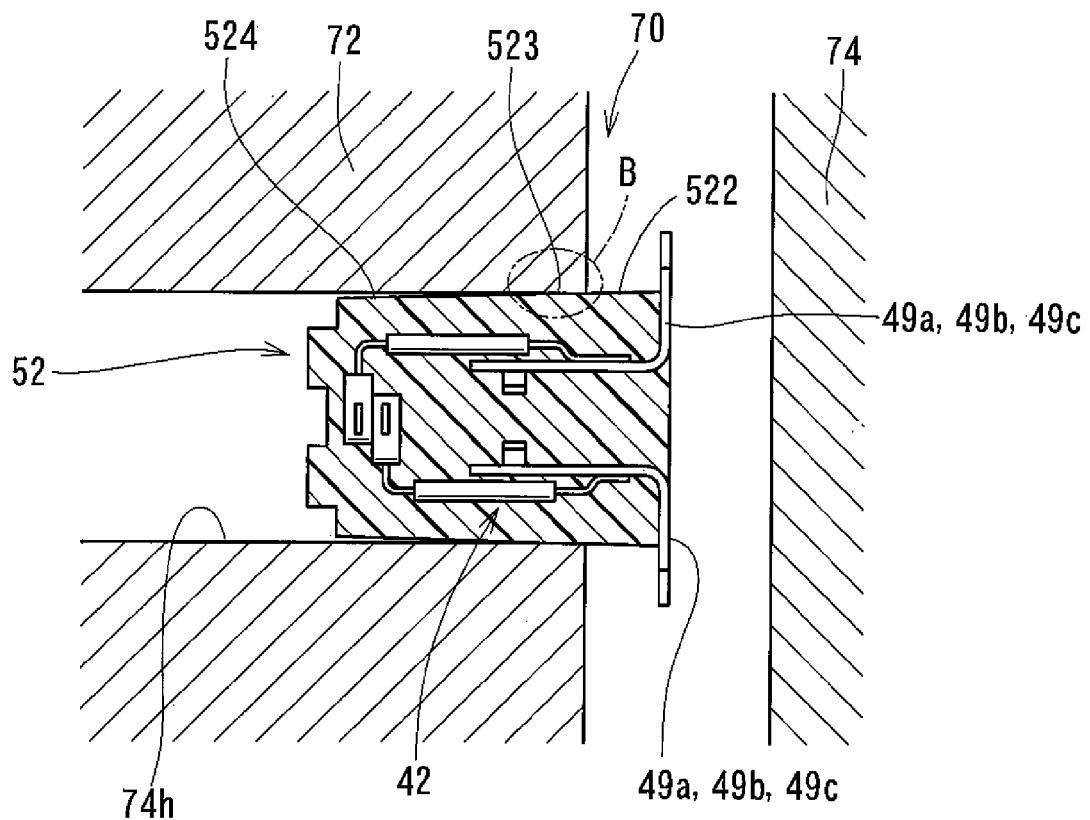
FIG. 10(A) is a cross sectional view showing a molding process of the first resin-molded portion.
FIG. 10(B) is an enlarged view of a region B in FIG. 10(A)
Figure 10:
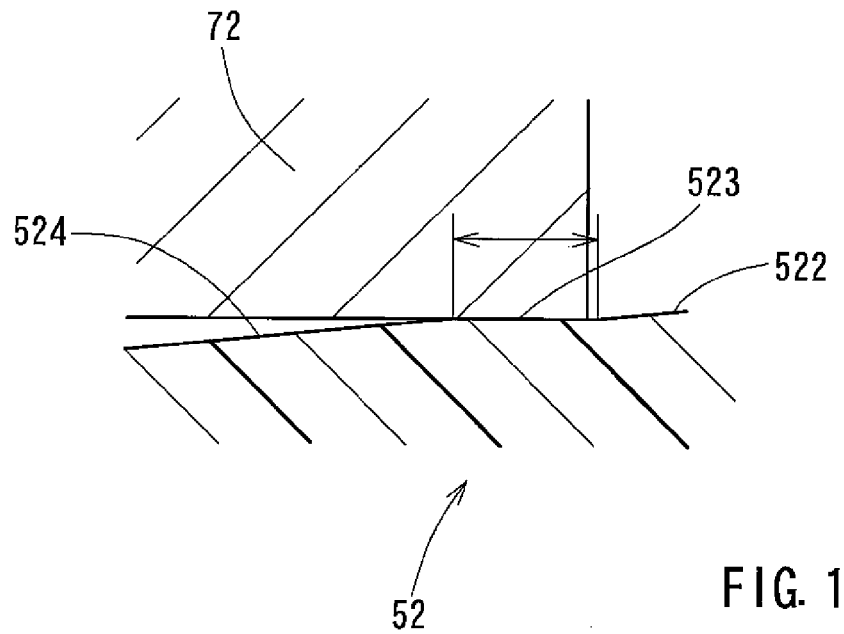

In this way, the stepped portions 62*f* and the pin 62*p* at the bottom of the molding cavity 62*f* of the primary die part 62 serve as projections for positioning the first and second sensor assemblies. Because of the incorporation of the pin 62*p* and the stepped portions 62*f*, a depression 52*d* corresponding to the configuration of the pin 62*p* and a pair of stepped surfaces 52*p* corresponding to the stepped portions 62*f* are formed on the surface of the first resin-molded portion 52 as shown in FIGS. 8 and 9.

After the resin-molded portion 52 has been molded, the first die 60 is opened and the resin-molded portion 52 is taken out of the first die 60. As shown in FIGS. 8 and 9, the first resin-molded portion 52 can be sectioned into an exposing section 524 intended to protrude from the inner wall of the side cover 50, an unexposing section 522 intended to be embedded within the side cover 50, and a boundary section 523 between the exposing section 524 and the unexposing section 522. The unexposing section 522 and the exposing section 524 of the resin-molded portion 52 are slightly tapered toward the front end of the resin-molded portion 52. However, no taper is provided to the boundary section 523. The molding cavity 62*f* is tapered to correspond to the tapered configurations of the unexposing section 522 and the exposing section 524 of the resin-molded portion 52. Therefore, the resin-molded portion 52 can be easily taken out of the primary die part 62.

As a resin material of the resin-molded portion 52, the same material as used for the angle sensors 42 may preferably be used. For example, if epoxy resin is used for the angle sensors 42, the same or similar epoxy resin may mold the resin-molded portion 52. Because of the use of the same or similar resin material, the resin material of the resin-molded portion 52 and the resin material of the angle sensors 42 have the same or substantially the same linear expansion coefficient. Therefore, it is possible to minimize the stress applied to the angle sensors 42 even if the first resin-molded portion 52 and the angle sensors 42 have been expanded or constricted due to change of the environmental temperature.

After the molding process of the resin-molded portion 52 has been completed, the exposing perpendicular portions T of the L-shaped conductors 49*a* for the supply of power of the first and second sensor assemblies are electrically connected to the end portion of the power supply conductor 53*a*. Similarly, the exposing perpendicular portions T of the L-shaped conductors 49*b* for grounding of the first and second sensor assemblies are electrically connected to the end portion of the ground conductor 53*b*, and the exposing perpendicular portions T of the L-shaped conductors 49*c* for outputting the signals from the first and second sensor assemblies are respectively electrically connected to the end portions of the first signal conductor 53*e* and the second signal conductor 53*f*.

End portions of the conductors 53*a*, 53*b*, 53*e* and 53*f* are configured as terminals T1 for a connector 55 provided on the side cover 50, and the conductors 53*a*, 53*b*, 53*e* and 53*f* are embedded within the side cover 50, except for their end portions or terminals T1.

<Molding Process of Side Cover 50>

The side cover 50 can be molded by a second die 70 shown in FIGS. 10(A) and 10(B). As shown in FIG. 10(A), the second die 70 includes a first die part 72 and a second die part 74. The first die part 72 is designed for molding the inner side portion of the side cover 50 and has at a predetermined position a cylindrical bore 72h for receiving the exposing section 524 and the boundary section 523 of the first resin-molded portion 52. The second die part 74 is designed for molding the outer side portion of the side cover 50 and is configured to be able to be divided into a plurality of die part sections. In FIG. 10(A), the conductors 53a, 53b, 53e and 53f are not shown for the purpose of illustration.

Before molding the side cover 50, with the second die 70 opened, the exposing section 524 and the boundary section 523 of the first resin-molded portion 52 are fitted into the bore 72h of the first die part 72. Then, the conductors 53a, 53b, 53e and 53f connected to the L-shaped conductors 49a, 49b and 49c are respectively positioned at predetermined positions with respect to the first die part 72.

Because the first resin-molded portion 52 has a substantially cylindrical configuration, the positioning operation of the conductors 53a, 53b, 53e and 53f can be easily performed by rotating the resin-molded portion 52 within the bore 72h of the first die part 72.

After the first resin-molded portion 52 and the conductors 53a, 53b, 53e and 53f have been set at predetermined positioned relative to the first die part 72 of the second die 70, the second die 70 is closed and the resin is injected into a cavity defined between the first die part 72 and the second die part 74, so that the side cover 50 can be molded. Simultaneously with the molding process of the side cover 50, the first resin-molded portion 52 is joined to or fixed in position relative to the inner wall of the side cover 50. As a resin material of the side cover 50, polybutylene terephthalate (PBT) or polyphenylene sulfide (PPS) can preferably used.

A corresponding connector of an electrical line from the engine control unit (ECU) can be connected to the connector 55 having the terminals T1 of the side cover 50, so that the outputs of the angle sensors 42 or the output signals corresponding to the rotational angle of the throttle shaft 16 can be inputted into the ECU.

In this way, the side cover 50 may be called as "a second-resin molded portion." An assembly of the side cover 50 and the first resin-molded portion 52 may be called as "a stationary section." The L-shaped conductors 49a, 49b and 49c embedded within the first resin-molded portion 52 may be called as "first conductors", and the conductors 53a, 53b, 53e and 53f embedded within the side cover 50 or the second resin-molded portion may be called as "second conductors."

The side cover 50 is then attached to the right side of the throttle body 12 such that the front portion of the first resin-molded portion 52 is inserted into the yoke 43 of the throttle gear 22 (see FIG. 1) and between the permanent magnets 41 in a non-contact manner. In the attached state of the side cover 50, the magnetic detecting elements 45 of the two angle sensors 42 are positioned substantially along the axis P of the throttle shaft 16 and between the magnets 41, and the front faces of the magnetic detecting elements 45 extend substantially perpendicular to the axis P of the throttle shaft 16.

According to the rotational angle detecting device 40 of this embodiment, the electrical connecting terminals 47a, 47b and 47c of the L-shaped conductors 49a, 49b and 49c serving as connector conductors are respectively directly connected to each other. Therefore, no printed circuit board is necessary. In addition, because the capacitors 48 are positioned on the inner side (on the side of the rotational axis P) of the L-shaped section, the capacitors 48 do not extend outward from the L-shaped section. Therefore, the construction around the angle sensor 41 becomes compact, and hence, it is possible to reduce the size of the rotational angle detecting device 40.

In addition, because the capacitors 48 are directly connected to the L-shaped conductors 49a, 49b and 49c or the connector conductors, it is possible to position the capacitors 48 proximally to the angle sensor 42. Therefore, the noise removing effect can be enhanced.

Further, the calculating part 46 of the angle sensor 42 is positioned parallel to the parallel portions H of the L-shaped conductors 49a, 49b and 49c or the connector conductors. In other words, only the magnetic detecting element 45 is positioned perpendicularly to the axis P of the throttle shaft 16. Therefore, it is possible to minimize the outer diameter of the first resin-molded portion 52.

The calculating part 46 of the angle sensor 42 and the parallel portions H of the L-shaped conductors 49a, 49b and 49c are arranged along the direction perpendicular to the axis P of the throttle shaft 16 with the clearance S provided there between. Therefore, it is possible to reduce the distance measured along the axis P from the front end of the angle sensor 42 to the parallel portions H. In addition, due to the clearance S, the calculating part 46 of the angle sensor 42 does not directly contact with the parallel portions H of the L-shaped conductors 49a, 49b and 49c. Therefore, even in the event that an external torsional force has been applied to the region between the angle sensor 42 and the L-shaped conductors 49a, 49b and 40c when positioning the angle sensor 42 and the L-shaped conductors 49a, 49b and 49c within the die 60 for molding the first resin-molded portion 52, such an external torsional force can be absorbed by portions of the electrical connecting terminals 47a, 47b and 47c of the angle sensor 42. Therefore, the external torsional force does not concentrate to the calculating part 46 or the L-shaped conductors 49a, 49b and 49c. For this reason, although the chip capacitors 48 are directly connected to the L-shaped conductors 49a, 49b and 49c, the chip capacitors 48 may not be damaged.

Further, because two sets of angle sensor assemblies each including the angle sensor 42 and its associated elements are provided, it is possible to detect the rotational angle even in the event that one of the angle sensors 42 has been failed. Therefore, the reliability of the rotational angle detecting device 40 can be improved.

Furthermore, because the angle sensors 42, the electric conductive terminals 47a, 47b and 47c, the capacitors 48 and the L-shaped conductors 49a, 49b and 49c are embedded within the resin of the first resin-molded portion 52, it is possible to reliably prevent the angle sensors 42 from being displaced or damaged.

As advantageous feature of the above embodiment in relation with the manufacturing process of the rotational angle detecting device 40, the first resin-molded portion 52 is molded by injecting the resin into the first die 60, while the first and second sensor assemblies each including the angle sensor 42 and its associated electrical connecting terminals 47a, 47b and 47c and the L-shaped conductors 49a, 49b and 49c are inserted into the first die 60. With this molding process, the first and second sensor assemblies can be embedded within the resin except for the perpendicular portions T of the L-shaped conductors 49a, 49b and 49c. Therefore, the first and second sensor assemblies can be reliably fixed in position by the resin. For this reason, even if the electrical connecting terminals 47a, 47b and 47c have a low strength, it is possible to avoid deformation of these terminals. Thus, the positional relation between the angle sensors 42 and their associated L-shaped conductors 49a, 49b and 49c can be reliably maintained by the resin of first resin-molded portion 52.

In addition, the second resin-molded portion or the side cover 50 is molded by injecting the resin into the second die 70, while the first resin-molded portion 52 and the conductors 53a, 53b, 53e and 53f connected to the L-shaped conductors 49a, 49b and 49c are inserted into the second die 70. Thus, the first and second sensor assemblies each including the angle sensor 42 are inserted into the second die 70, while they are fixed in position relative to the conductors 53a, 53b, 53e and 53f with the aid of the first resin-molded portion 52. Therefore, the angle sensors 42 do not cause displacement relative to the side cover 50 during the manufacturing process. As a result, it is possible to prevent or minimize production of defective rotational angle detecting devices.

Further, if the resin of the first resin-molded portion 52 and the resin used for the angle sensors 42 are the same or similar to each other, they have the same linear coefficient or have linear expansion coefficients similar to each other. Therefore, even if the first resin-molded portion 52 and the angle sensors 42 have expanded or constricted due to change of the environmental temperature, it is possible to prevent or minimize the stress applied to the angle sensors 42.

Because the exposing section 524 and unexposing section 522 of the first resin-molded portion 52 are slightly tapered toward the front end of the first resin-molded portion 52, it is possible to easily remove the first resin-molded portion 52 from the primary die part 62 of the first die 60 after the molding process. On the other hand, no taper is provided to the boundary section 523 of the first resin-molded portion 52. In other words, a section without taper is provided along a length of the first resin-molded portion 52. Therefore, it is possible to prevent or minimize the creation of a clearance between the second die 70 and the boundary section 523 of the first resin-molded portion 52 when first resin-molded portion 52 is inserted into the second die 70 such that the unexposing section 522 extends within the cavity of the second die 70. As a result, it is possible to prevent or minimize the generation of burrs between the side cover 50 and the boundary section 523 when the side cover 50 is molded.

Further, the L-shaped conductors 49a, 49b and 49c or the first conductors are separated from the conductors 53a, 53b, 53e and 53f or the second conductors. Therefore, it is possible to manufacture a variety of stationary sections (assemblies of the first resin-molded portion 52 and the side cover 50) by preparing a variety of side covers 50 while using the same first resin-molded portions 52.

Furthermore, because the first resin-molded portion 52 has a substantially cylindrical configuration, it is possible to easily position the conductors by rotating the conductors about the first resin-molded portion 52 for changing the positions of the conductors when the first resin-molded portion 52 and the associated conductors are inserted into the second mold 70.

Figure 11:
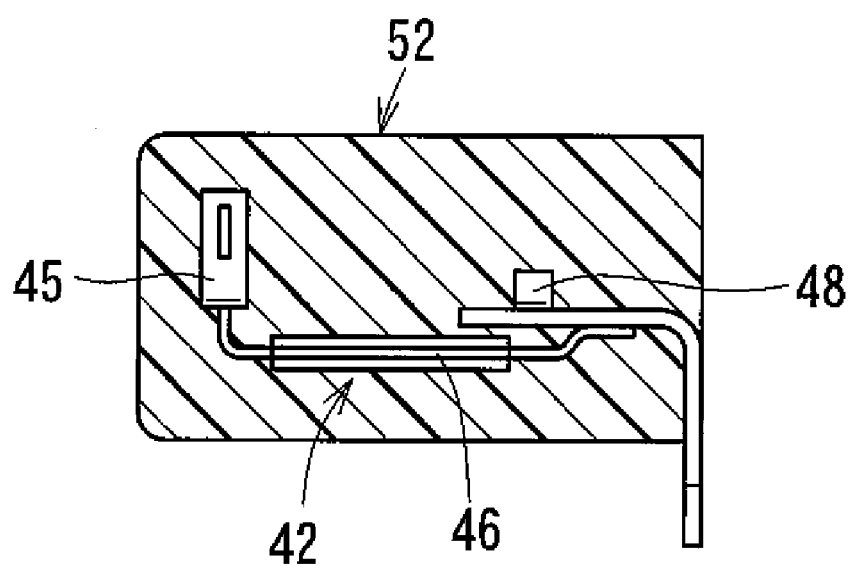
FIG. 11 is a vertical sectional view showing a cross sectional view of a first resin-molded portion of a rotational angle detecting device according to an alternative embodiment.

The present invention may not be limited to the embodiment described above but may be modified in various ways. For example, although two sensor assemblies or two sets of the sensors 42 and their associated elements, such as the L-shaped conductors 49a, 49b and 49c, are provided for the purpose of fail safe in this embodiment, only a single sensor assembly or a single set of the sensor 42 and its associated elements can be provided as shown in FIG. 11.

Figure 12:
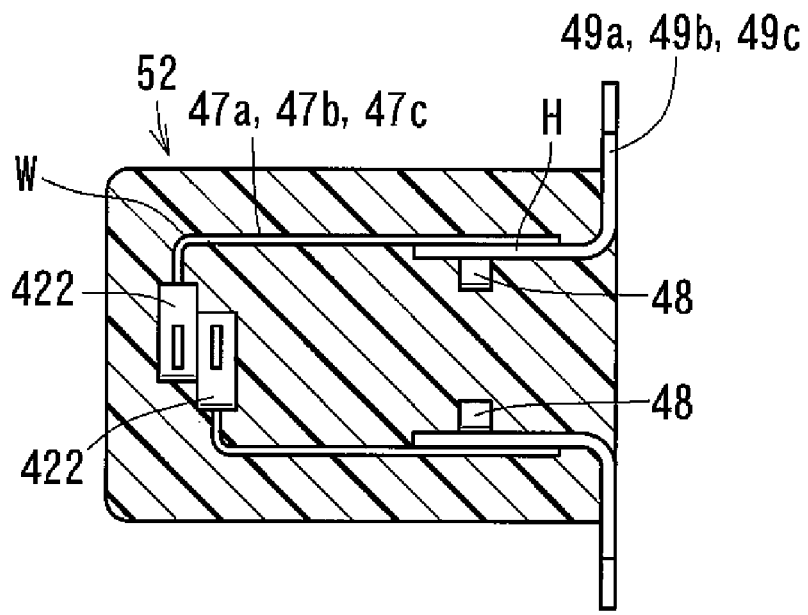
FIG. 12(A) is a vertical sectional view showing a cross sectional view of a first resin-molded portion of a rotational angle detecting device according to another alternative embodiment.
FIG. 12(B) is a vertical sectional view similar to FIG. 12(A) but showing a modification in which a single angle sensor is provided.
Figure 12:
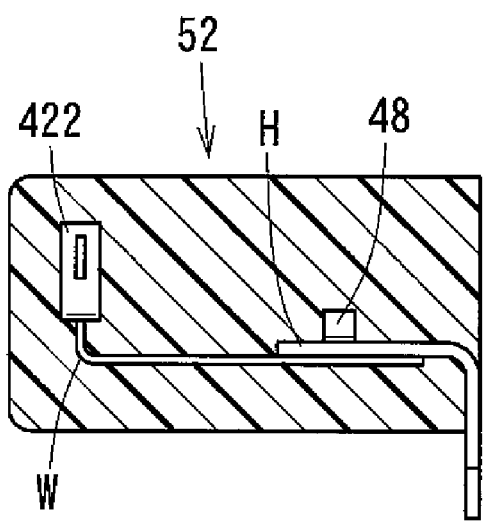
Figure 14:
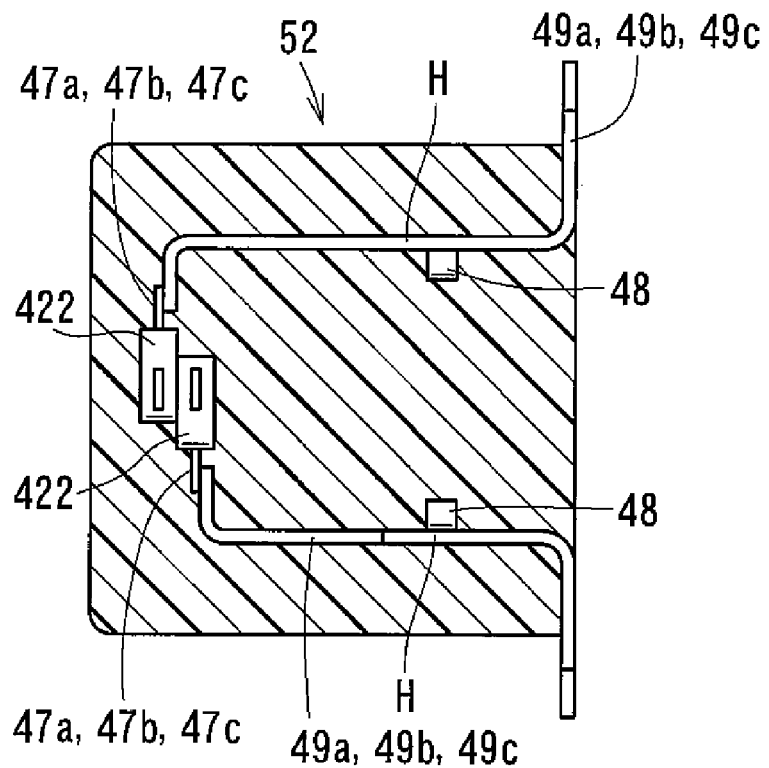
FIG. 14(A) is a vertical sectional view showing a cross sectional view of a first resin-molded portion of a rotational angle detecting device according to a still further alternative embodiment.
FIG. 14(B) is a vertical sectional view similar to FIG. 14(A) but showing a modification in which a single angle sensor is provided.
Figure 14:
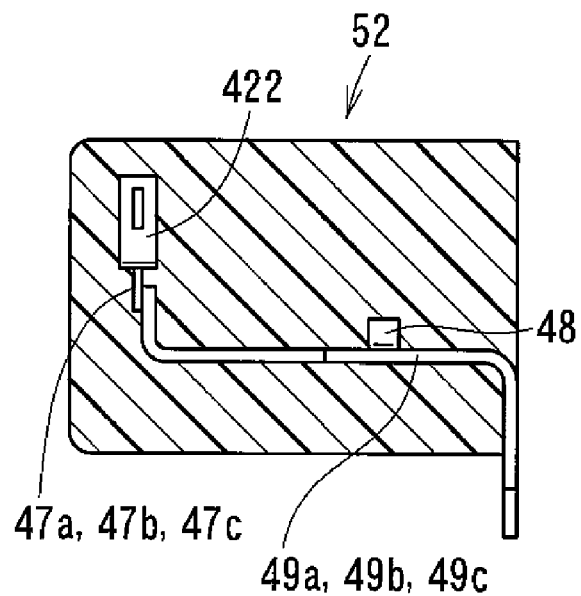

Further, although the magnetic detecting element 45 and the calculating part 46 of the angle sensor 42 are configured as separate elements, it is possible to use angle sensors 422 shown in FIGS. 12(A) and 12(B), in which each angle sensor 422 corresponds to the magnetic detecting element 45 and the calculating part 46 integrated with each other. In this case, in a viewpoint of a manufacturing process, it may be preferable that bent portions W are provided to the electrical connecting terminals 47a, 47b and 47c in order to position the angle sensor 422 perpendicular to the parallel portions H of the L-shaped conductors 49a, 49b and 49c. Alternatively, as shown in FIGS. 14(A) and 14(B), it is possible to perpendicularly bent the front end portions (left end portions as viewed in FIGS. 14(A) and 14(B)) of the parallel portions H of the L-shaped conductors 49a, 49b and 49c and to connect the electrical connecting terminals 47a, 47b and 47c having no bent portions to the front end portions of the parallel portions H.

Figure 13:
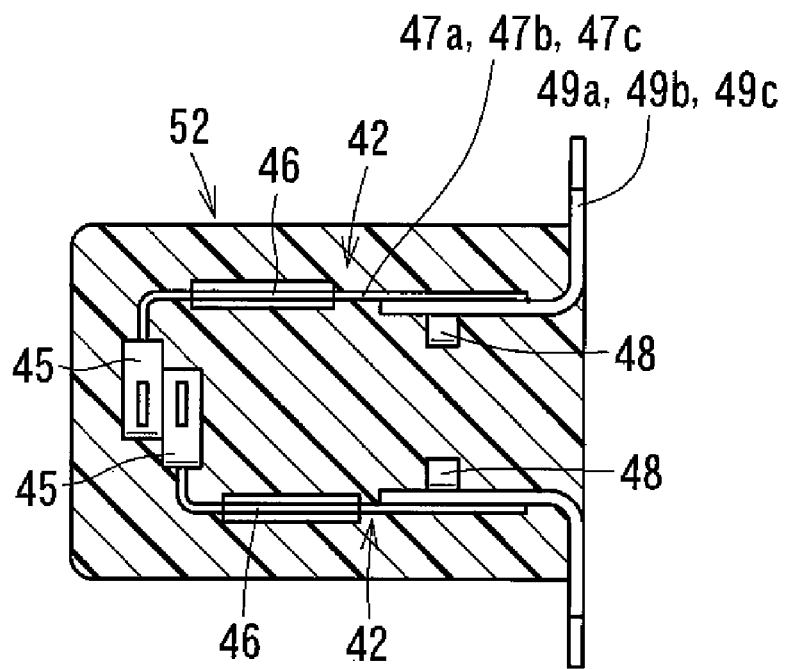
FIG. 13(A) is a vertical sectional view showing a cross sectional view of a first resin-molded portion of a rotational angle detecting device according to a further alternative embodiment.
FIG. 13(B) is a vertical sectional view similar to FIG. 13(A) but showing a modification in which a single angle sensor is provided.
Figure 13:
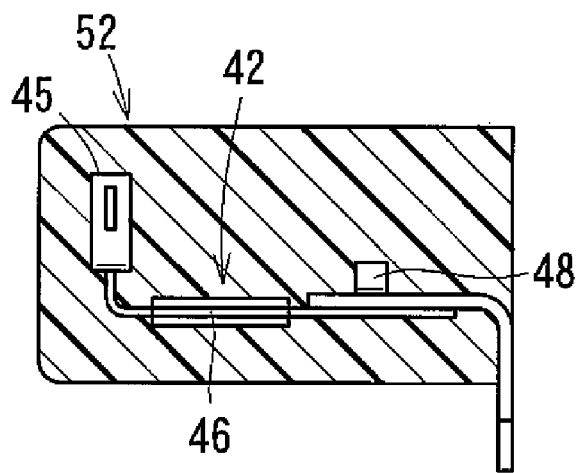

Further, although the calculating part 46 of the angle sensor 42 and the parallel portions H of the L-shaped conductors 49a, 49b and 49c are arranged parallel to each other with the clearance S provided there between in the above embodiment, it is possible to arrange the parallel portions H of the L-shaped conductors 49a, 49b and 49c in series with the calculating part 46 as shown in FIGS. 13(A) and 13(B) along a straight line.

Figure 15:
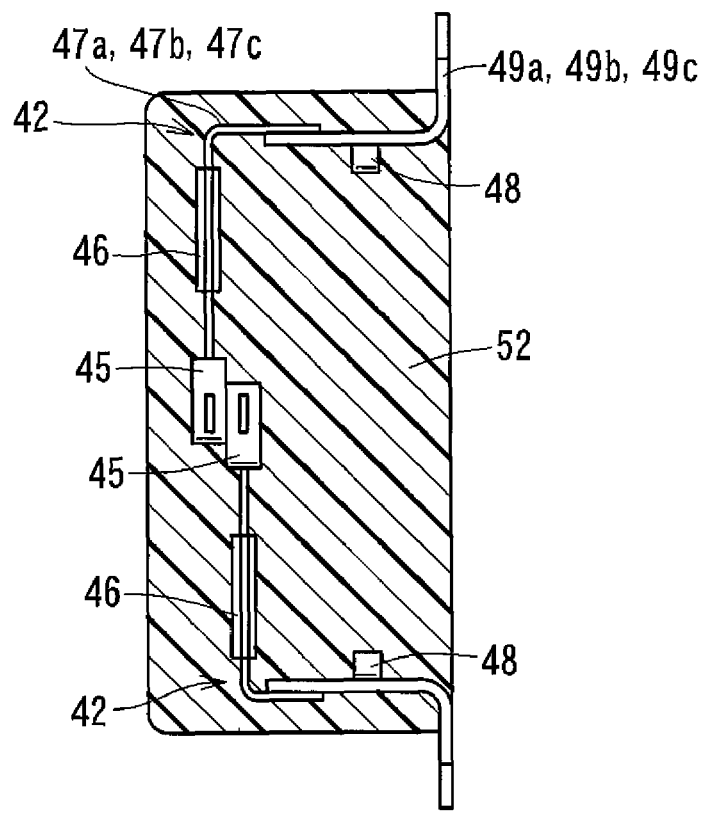
FIG. 15(A) is a vertical sectional view showing a cross sectional view of a first resin-molded portion of a rotational angle detecting device according to a still further alternative embodiment.
FIG. 15(B) is a vertical sectional view similar to FIG. 15(A) but showing a modification in which a single angle sensor is provided.
Figure 15:
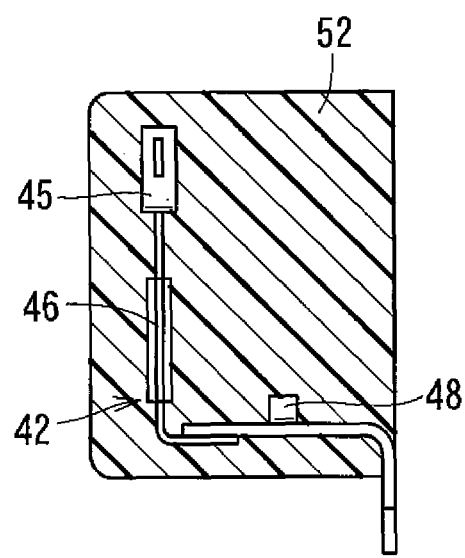
Figure 16:
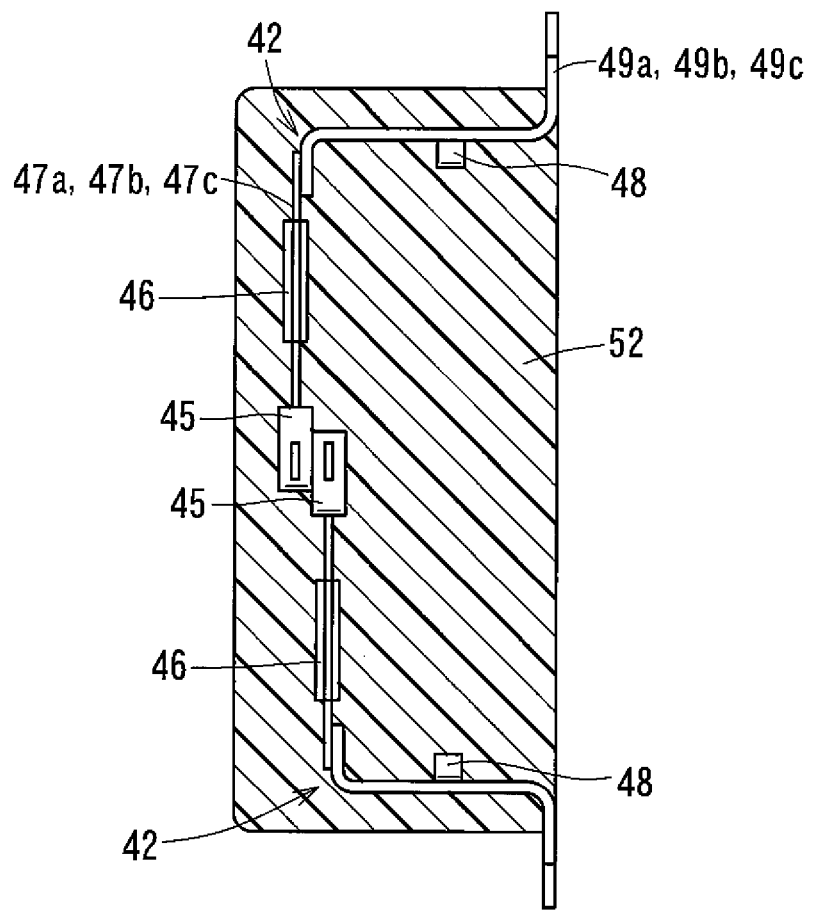
FIG. 16(A) is a vertical sectional view showing a cross sectional view of a first resin-molded portion of a rotational angle detecting device according to a further alternative embodiment.
FIG. 16(B) is a vertical sectional view similar to FIG. 16(A) but showing a modification in which a single angle sensor is provided.
Figure 16:
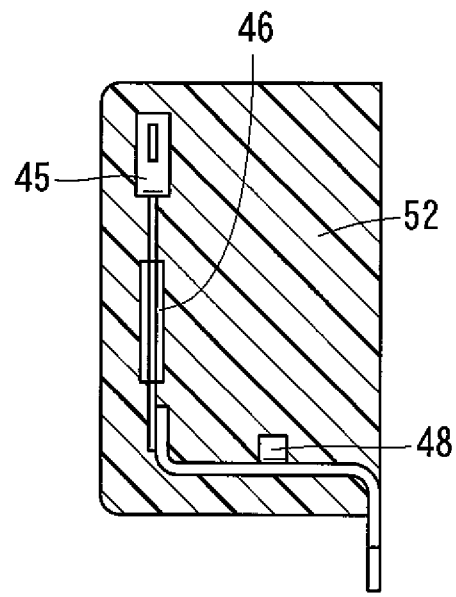
Figure 17:
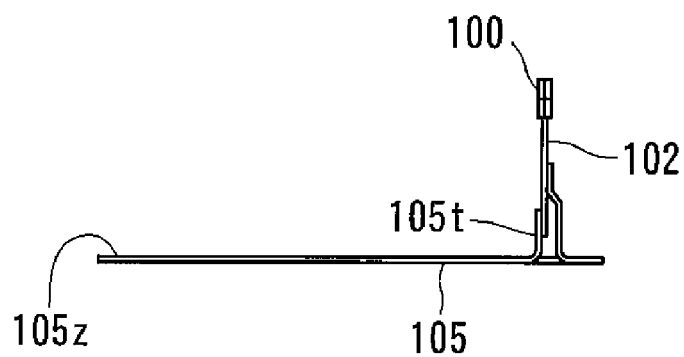
FIGS. 17(A) and 17(B) are side views showing manufacturing steps of a known rotational angle detecting device.
Figure 17:
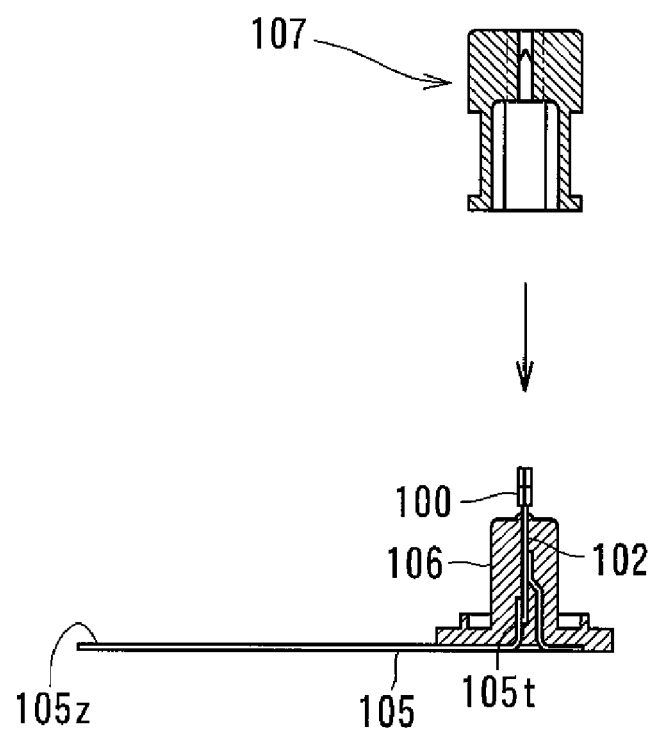

Further, although the signal conductors 44 between the magnetic detecting element 45 and the calculating part 46 of the angle sensor 42 are bent at right angles in the above embodiment, it is possible to arrange the magnetic detecting element 45 and the calculating part 46 along a straight line as show in FIGS. 15(A) and 15(B). In this connection, portions of the electrical connecting terminals 47a, 47b and 47c on the side of the L-shaped conductors 49a, 49b and 49c are bent at right angles and are connected to the parallel portions H of the L-shaped conductors 49a, 49b and 49c. Alternatively, in place of bending portions of the electrical connecting terminals 47a, 47b and 47c, portions of the L-shaped conductors 49a, 49b and 49c on the side of the electrical connecting terminals 47a, 47b and 47c may be bent at right angles and may be connected to the electrical connecting terminals 47a, 47b and 47c as shown in FIGS. 16(A) and 16(B).

With the arrangements shown in FIGS. 15(A), 15(B), 16(A) and 16(B), the magnetic detecting element 45 and the calculating part 46 are positioned perpendicularly to the parallel portions H of the L-shaped conductors 49a, 49b and 49c. Therefore, it is possible to minimize the size of the first resin-molded portion 52 along the axial direction.

Furthermore, although the power supply conductor 53a, the grounding conductor 53b and the first and second signal conductors 53e and 53f are formed as separate elements from the L-shaped conductors 49a, 49b and 49c, it is possible to form the power supply conductor 53a, the grounding conductor 53b and the first and second signal conductors 53e and 53f integrally with the corresponding L-shaped conductors 49a, 49b and 49c.

Furthermore, although the rotational angle detecting device 40 of above embodiment has been used for detecting the rotational angle of the throttle shaft 16 of the throttle control device 10, the rotational angle detecting device 40 can be used for detecting the rotational angle of any other devices, such as a device for detecting the rotational angle of a flow control valve for controlling the flow of a liquid.

Furthermore, although the rotational angle detecting device 40 of the above embodiments determines the rotational angle of the throttle valve 18 based on the change of direction of the magnetic field produced by the magnets 41, it is possible to determine the rotational angle based on the change of intensity of the magnetic field.

This invention claims:

1. A rotational angle detecting device comprising:
    a pair of permanent magnets attached to a rotary section and opposing to each other with respect to a rotational axis of the rotary section so as to produce a magnetic field therebetween;
    an angle sensor attached to a stationary section and positioned between the pair of permanent magnets, the angle sensor being constructed to determine a rotational angle of the rotary section based on change of the magnetic field caused by the rotation of the rotary section; and a connector provided on the stationary section and constructed to connect the angle sensor to an external device; wherein electrical connecting terminals are connected to the angle sensor and further connected to first ends of conductors each having a strength greater than each of the electrical connecting terminals;

wherein the conductors have seconds ends opposite to the first ends and serving as connector terminals of the connector;

wherein the rotational angle detecting device further comprises:

a first resin-molded portion obtained by injecting a first resin into a first die, while at least the electrical connecting terminals, a part of the angle sensor and the first ends of the conductors are inserted into a first cavity of the first die; and a second resin-molded portion obtained by injecting a second resin into a second die, while portions of the conductors extending from the first resin-molded portion are inserted into a second cavity of the second die;

wherein the stationary section comprises the first resin-molded portion and the second resin-molded portion; and wherein the connector is provided on the second resin-molded portion.

2. The rotational angle detecting device as in claim 1, wherein the angle sensor is constructed to determine the rotational angle of the rotary section based on change of direction of the magnetic field produced between the permanent magnets.

3. The rotational angle detecting device as in claim 1,
wherein the angle sensor comprises a magnetic detecting element and an calculating part,
wherein the magnetic detecting element is constructed to detect the change of the magnetic field produced between the permanent magnets; and
wherein the calculating part calculates the rotational angle based on an output signal from the magnetic detecting element.

4. The rotational angle detecting device as in claim 1,
wherein the first resin of the first resin-molded portion has a first linear expansion coefficient;
wherein the second resin of the second resin-molded portion has a second linear expansion coefficient that is substantially the same as the first linear expansion coefficient.

5. The rotational angle detecting device as in claim 1,
wherein the first resin of the first resin-molded portion has a first linear expansion coefficient;
wherein the second resin of the second resin-molded portion has a second linear expansion coefficient;
wherein the angle sensor comprise a third resin having a third linear expansion coefficient; and
wherein the first linear expansion coefficient is closer to the third linear expansion coefficient than the second linear expansion coefficient.

6. The rotational angle detecting device as in claim 1,
wherein the first resin-molded portion comprises an unexposing section, an exposing section and a boundary section extending along a length between the unexposing section and the exposing section;
wherein the unexposing section is positioned within the second cavity of the second die during the molding process of the second resin-molded portion;
wherein the exposing section is positioned out of the second cavity of the second die during the molding process of the second resin-molded portion; and
wherein the unexposing section and the exposing section are tapered toward a front end of the exposing section; and wherein the boundary section is not tapered.

7. The rotational angle detecting device as in claim 1,
wherein the conductors connecting between the electrical connecting terminals of the angle sensor and the connector are divided into first conductors embedded within the first resin-molded portion and second conductors constituting the terminals of the connector; and
wherein portions of the first conductors extending from the first resin-molded portion, connecting regions between the first and second conductors, and the second conductors are embedded within the second-resin molded portion.

8. The rotational angle detecting device as in claim 1, wherein the first resin-molded portion has a substantially cylindrical configuration.

9. The rotational angle detecting device as in claim 1, wherein the first resin-molded portion comprises a recess formed therein, and wherein the recess is formed by a positioning projection that is provided on an inner wall of the first cavity of the first die for positioning the angle sensor.

10. The rotational angle detecting device as in claim 1, wherein the rotary section comprises a shaft of an intake air control device disposed within an intake air channel of an internal combustion engine, and wherein the stationary section comprises a casing of the intake air control device.

11. A rotational angle detecting device comprising:
a pair of permanent magnets attached to a rotary section and opposing to each other with respect to a rotational axis of the rotary section so as to produce a magnetic field therebetween;
an angle sensor assembly comprising:
an angle sensor attached to a stationary section and positioned between the pair of permanent magnets, the angle sensor being constructed to determine a rotational angle of the rotary section based on change of the magnetic field caused by the rotation of the rotary section; and
connector conductors connected to electrical connecting terminals of the angle sensor; and
at least one capacitor connected to any of the connector conductors;
wherein the angle sensor comprises a magnetic detecting element positioned substantially perpendicularly to the rotational axis of the rotary section;
wherein the connector conductors comprise parallel portions extending substantially parallel to the rotational axis; and
wherein a portion of the angle sensor assembly extending from the angle sensor to the parallel portions of the connector conductors has a substantially L-shaped configuration; and
wherein the at least one capacitor is disposed on the same side as the magnetic detecting element with respect to the L-shaped portion.

12. The rotational angle detecting device as in claim 11, wherein the angle sensor is constructed to determine the rotational angle of the rotary section based on change of direction of the magnetic field produced between the permanent magnets.

13. The rotational angle detecting device as in claim 12,
wherein the angle sensor comprises a magnetic detecting element and an calculating part, wherein the magnetic detecting element is constructed to detect the change of the magnetic field produced between the permanent magnets; and wherein the calculating part is positioned substantially in parallel to the parallel portions of the connector conductors.

14. The rotational angle detecting device as in claim 11, wherein the angle sensor comprises a magnetic detecting element and an calculating part, wherein the magnetic detecting element is constructed to detect the change of the magnetic field produced between the permanent magnets; and wherein the magnetic detecting element and the calculating part are positioned substantially perpendicularly to the parallel portions of the connector conductors.

15. The rotational angle detecting device as in claim 13, wherein, the calculating part of the angle sensor and the parallel portions of the connector conductors are spaced from each other in juxtaposed relation.

16. The rotational angle detecting device as in claim 11, comprising two sensor assemblies and wherein the magnetic detecting elements of the two sensor assemblies oppose to each other along the rotational axis of the rotary section, and wherein the angle sensors of the two sensor assemblies oppose to each other with respect to the rotational axis.

17. The rotational angle detecting device as in claim 11, further comprising a resin body, and wherein at least a part of the angle sensor, the electrical connecting terminals, the at least one capacitor and at least portions of the connector conductors are embedded within the resin body.

* * * * *